J. L. White.
Car Truck.
Nº 8,643.  Patented Jan. 6, 1852.

UNITED STATES PATENT OFFICE.

JOHN L. WHITE, OF CORNING, NEW YORK.

TRUCK FOR LOCOMOTIVES.

Specification of Letters Patent No. 8,643, dated January 6, 1852.

*To all whom it may concern:*

Be it known that I, JOHN L. WHITE, of Corning, in the county of Steuben and State of New York, have invented certain new and useful Improvements in the Trucks of Locomotive-Engines, and that the following is a full, clear, and exact description of the principle or character which distinguishes them from all other things before known, and of the usual manner of making, modifying, and using the same, reference being had to the accompanying drawing, in which—

Figure 3:
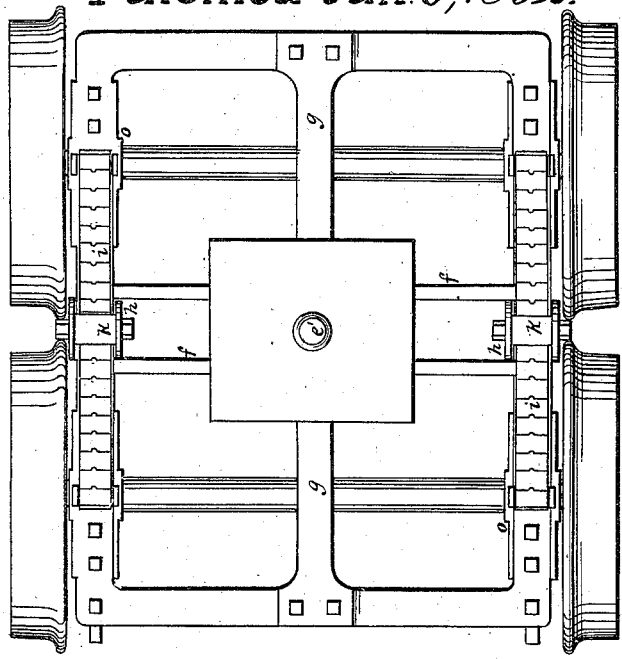
Figure 2:
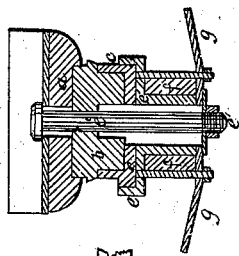
Figure 2:
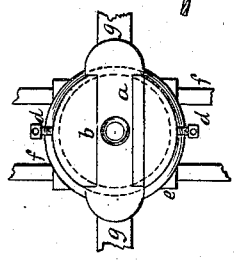
Figure 1:
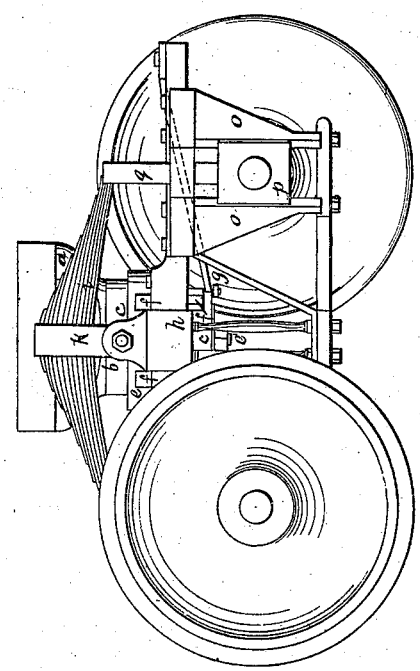

Figure 1, is a side elevation; Fig. 2, parts detached; Fig. 3, plan.

The nature of my improvements consists in rendering the truck, in its connection with the boiler, perfectly pliable and free to turn a curve, or wind in any way, and to keep the weight, under all circumstances, equally distributed on the four truck wheels, whether the road be rough or smooth, winding or uneven in any way; rendering its action safe, easy, and durable, which is effected by means of a peculiarly constructed joint connecting the truck frame with the boiler, so as to keep it up parallel with the main frame, and connecting the springs in combination therewith, so as to act as balancing levers.

The construction is as follows:—the joint is composed of a semicylindrical rib (*a*) attached to the boiler in a longitudinal direction, and directly over the center of the truck frame, the curved surface being downward; this rib (*a*) rests in a recess made to fit it below, formed in a block (*b*), the lower portion of which is circular in its horizontal section, as clearly shown in Fig. 2, which forms a knuckle joint that has a sufficient bearing to hold up the truck frame parallel with the main frame, while it has freedom to roll; the lower part of block (*b*) enters and rests in a cup piece (*c*), made eccentric, as seen in the Fig. 2, and having two or more set screws (*d*) in its rim, by which it is affixed to the block (*b*) above named; this cup fits into a recess in the turning plate or wheel (*e*) attached to the cross bars (*f*) at the center of the frame of the truck, to which it is firmly bolted. The cross bars (*f*), and also one (*g*) at right angles to it, are of iron, or other suitable material, and should be sunk in the center to bring the joint lower; the eccentric cup (*c*) can be set in any position, so as to throw the joint to either side to bring the truck into line to track square, a very essential point in adjusting the engine; a pin or bolt (*e'*) passes loosely down through these parts from the smoke box of the boiler to a point below the cross bars of the truck frame, where it is held by a nut and screw. The truck frame is nearly square, as shown in the drawing; and to either side is affixed the pedestals (*o*) for the sliding boxes (*p*), in which the axles run; these pedestals are braced at bottom in a sufficient manner by a bar extending from one to the other, which bar is connected by short posts and diagonal braces with the frame above; a strap (*h*) passes around the frame at this center point of the side frame on each side, to each of which the springs (*i*) two in number, are jointed by means of another strap (*k*) passing around their centers; the two ends of each spring, which are over the sliding boxes, are connected therewith by a stirrup (*q*), by which arrangement it will be perceived that there is a free action given to each wheel to rise or fall, independent of the falling or rising of the truck frame, and always to bear on the rail with equal force, however uneven the road may be, while the joint above described permits the boiler or the truck to roll without straining the parts, and thus keep the wheels at all times firmly down to the rails; the eccentric in the joint admitting the truck to be set exactly in line to track accurately as above stated.

The advantages of these improvements are to prevent the danger of running off the track on bad roads, or short curves, and to give greater stability and security to the parts at all times, bringing an equal bearing on each of the wheels.

Having thus fully described my improved truck, what I claim therein as new, and which I desire to secure by Letters Patent, is—

The joint connecting the truck with the boiler, consisting of a long semi-cylindrical bearing, and an adjustable eccentric for putting the truck in line, substantially in the manner and for the purposes set forth.

JOHN L. WHITE.

Witnesses:
E. G. BRUNDAGE,
WM. GREENOUGH.